United States Patent
Meyer Zu Helligen et al.

(10) Patent No.: US 7,729,834 B2
(45) Date of Patent: Jun. 1, 2010

(54) METHOD FOR CREATING REFERENCE DRIVING TRACKS FOR AGRICULTURAL WORKING MACHINES

(75) Inventors: Lars Peter Meyer Zu Helligen, Spenge (DE); Norbert Diekhans, Guetersloh (DE); Andreas Brunnert, Rietberg (DE); Ingo Beermann, Telgte (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 699 days.

(21) Appl. No.: 11/623,123

(22) Filed: Jan. 15, 2007

(65) Prior Publication Data

US 2007/0168116 A1 Jul. 19, 2007

(30) Foreign Application Priority Data

Jan. 18, 2006 (DE) .......................... 10 2006 002 567

(51) Int. Cl.
*A01B 69/00* (2006.01)
*G05D 1/02* (2006.01)
*G06F 19/00* (2006.01)

(52) U.S. Cl. .............................. 701/50; 701/25; 701/35; 460/1

(58) Field of Classification Search .................... 701/50, 701/23–26, 28, 200, 35; 460/1; 340/994, 340/988; 172/4, 5, 6; 56/10.2 F
See application file for complete search history.

(56) References Cited

U.S. PATENT DOCUMENTS

| | | | | |
|---|---|---|---|---|
| 5,991,694 A | * | 11/1999 | Gudat et al. | 702/2 |
| 6,085,130 A | * | 7/2000 | Brandt et al. | 701/26 |
| 6,112,143 A | * | 8/2000 | Allen et al. | 701/25 |
| 6,205,381 B1 | * | 3/2001 | Motz et al. | 701/25 |
| 6,236,924 B1 | * | 5/2001 | Motz et al. | 701/50 |
| 6,493,374 B1 | * | 12/2002 | Fomenkov et al. | 372/102 |
| 6,609,065 B1 | * | 8/2003 | Lange et al. | 701/213 |
| 6,643,576 B1 | * | 11/2003 | O Connor et al. | 701/50 |
| 6,681,551 B1 | * | 1/2004 | Sheidler et al. | 56/10.2 G |

FOREIGN PATENT DOCUMENTS

DE 43 42 171 5/1994

\* cited by examiner

*Primary Examiner*—Tan Q Nguyen
(74) *Attorney, Agent, or Firm*—Michael J. Striker

(57) ABSTRACT

A route planning system for agricultural working machines with a defined working width assigned to the agricultural working machine to generate driving routes in a territory includes a navigation module configured to generate the driving routes and having at least one automatic driving mode and at least one recording mode, such that said at least one automatic driving mode and the at least one recording mode are activatable independently of each other.

10 Claims, 3 Drawing Sheets

METHOD FOR CREATING REFERENCE DRIVING TRACKS FOR AGRICULTURAL WORKING MACHINES

CROSS-REFERENCE TO A RELATED APPLICATION

The invention described and claimed hereinbelow is also described in German Patent Application DE 10 2006 002 567.9, filed Jan. 18, 2006. This German Patent Application, whose subject matter is incorporated here by reference, provides the basis for a claim of priority of invention under 35 U.S.C. 119 (a)-(d).

BACKGROUND OF THE INVENTION

The present invention relates to a route planning system for agricultural working machines.

The related art makes known a large number of generic route planning systems which are used to record driving routes for a vehicle to be driven over a territory to be worked, and the automatic implementation of previously programmed driving routes by the aforementioned vehicle. For example, publication DE 43 42 171 describes the recording of routes that the soil-working machine has covered on a territory to be worked for a soil-working process which uses GPS-based position data. The driving route data from the agricultural working machine determined in this manner are then converted—depending on the design of the data processing device—in the particular agricultural working machine or in a central arithmetic unit into driving route data, which can then be displayed on-line or stored in a retrievable manner. Systems of this type have the disadvantage, in particular, that the vehicle must first work a certain driving route before it is contained—in a retrievable manner—in the memory unit, and, optionally, before it is available as a basic data record used to generate driving routes to be worked in the future.

A route-planning method which is typically used today in combination with "automatic" track-following systems is disclosed, e.g., in U.S. Pat. No. 6,236,924. Since a territory to be worked is initially selected in a software-supported manner using distinct reference points and this selected territory is then divided into defined driving routes using various optimization criteria, a predefined route plan can be provided to the vehicle after the vehicle is automatically driven over the territory to be worked. Systems of this type also have the disadvantage that distinct reference points must first be determined for the territory to be selected and, to do this, it is necessary to access previously-generated data or to first drive the particular vehicle around the territory to be selected. While, in terms of accessing previously-generated data, one is limited to the information content of this data, driving the particular vehicle directly over the territory to be worked represents a great deal of preparatory effort which must be expended to implement route planning.

SUMMARY OF THE INVENTION

The object of the present invention, therefore, is to avoid the disadvantages of the related art described above and, in particular, to provide a route planning system which can quickly and precisely assign driving routes to a territory to be worked, thereby greatly reducing the amount of effort required to generate these driving routes.

In keeping with these objects and with others which have become apparent hereinafter, one feature of the present invention resides, briefly stated, in a route planning system for agricultural working machines, with a defined working width assigned to the agricultural working machine to generate driving routes in a territory, the route planning system comprising a navigation module configured to generate the driving routes, said navigating module including at least one automatic driving mode and at least one recording mode, such that said at least one automatic driving mode and said at least one recording mode are activatable independently of each other.

Given that the route planning system includes a navigation module which includes one or more automatic driving modes and at least one recording mode, and the automatic driving mode(s) and the at least one recording mode can be activated independently of each other, it is ensured that the agricultural working machine can be operated in the automatic driving mode and that, simultaneously, a reference line for an automatic mode to be implemented in the future is recorded. As a result, an existing driving route is worked and, simultaneously, a new driving route which will be required in the future is generated, thereby greatly reducing the amount of effort required to generate these driving routes.

In an advantageous embodiment of the present invention, a defined driving route is recorded in an automatic driving mode, which simultaneously represents the reference line of one or more driving routes to be subsequently worked. This has the advantage, in particular, that the route planning is carried out based on very precise data on the territory to be worked, and the generation of these precise, "on-line" data does not require that unproductive drives be carried out to define required reference points on the territory to be worked.

In a further advantageous embodiment of the present invention, the driving routes defined by the reference line and to be worked subsequently are combined in a crop bed function module as a crop bed function. This ensures that the subdivision of the territory to be subsequently worked or a section of this territory with defined driving routes can be completed before the vehicle finishes working the territory where it is currently working.

An advantageous refinement of the present invention results when the defined driving route is implemented by selecting a start point and an end point which bound the defined driving route. In this manner, the operator of the vehicle can easily define the shape of the new reference line. In a very simple embodiment, this is attained by selecting the start point and end point by generating a start and stop signal in a recording unit. Even simpler handling results when, in an advantageous embodiment of the present invention, the control and evaluation unit includes a display unit designed as a touchscreen monitor, and the start point and end point are determined by making a selection on the touchscreen monitor. This also allows the operator to freely select a suitable reference line, since any section of a route can be defined on the screen as a new reference line.

In an advantageous embodiment of the present invention, the crop bed function includes the step of subdividing a territory to be worked into a large number of driving routes, thereby enabling a territory of any size to be worked to be subdivided into driving routes in a single step.

A particularly flexible use of the inventive route planning system results when the automatic driving modes include driving along a straight route bounded by a start point and an end point, driving along a contour route bounded by a start point and an end point, and contour driving without limitation by a start point and an end point, or a combination of at least these automatic driving modes. This flexibility of the route planning system is increased further when the particular automatic driving mode is freely selectable and it is possible to switch between various automatic driving modes.

A further advantageous embodiment of the present invention results when the recording of a defined driving route takes place in one of the automatic driving modes, and this defined driving route represents the reference line for the crop bed function of another automatic driving mode. This has the advantage, in particular, that a reference line having any structure can be generated in any automatic driving mode, thereby enabling the method for generating a reference line to be implemented in a highly flexible manner.

The novel features which are considered as characteristic for the present invention are set forth in particular in the appended claims. The invention itself, however, both as to its construction and its method of operation, together with additional of specific embodiments when read in connection with the accompanying drawings.

DESCRIPTION OF THE PREFERRED EMBODIMENTS

Figure 1:
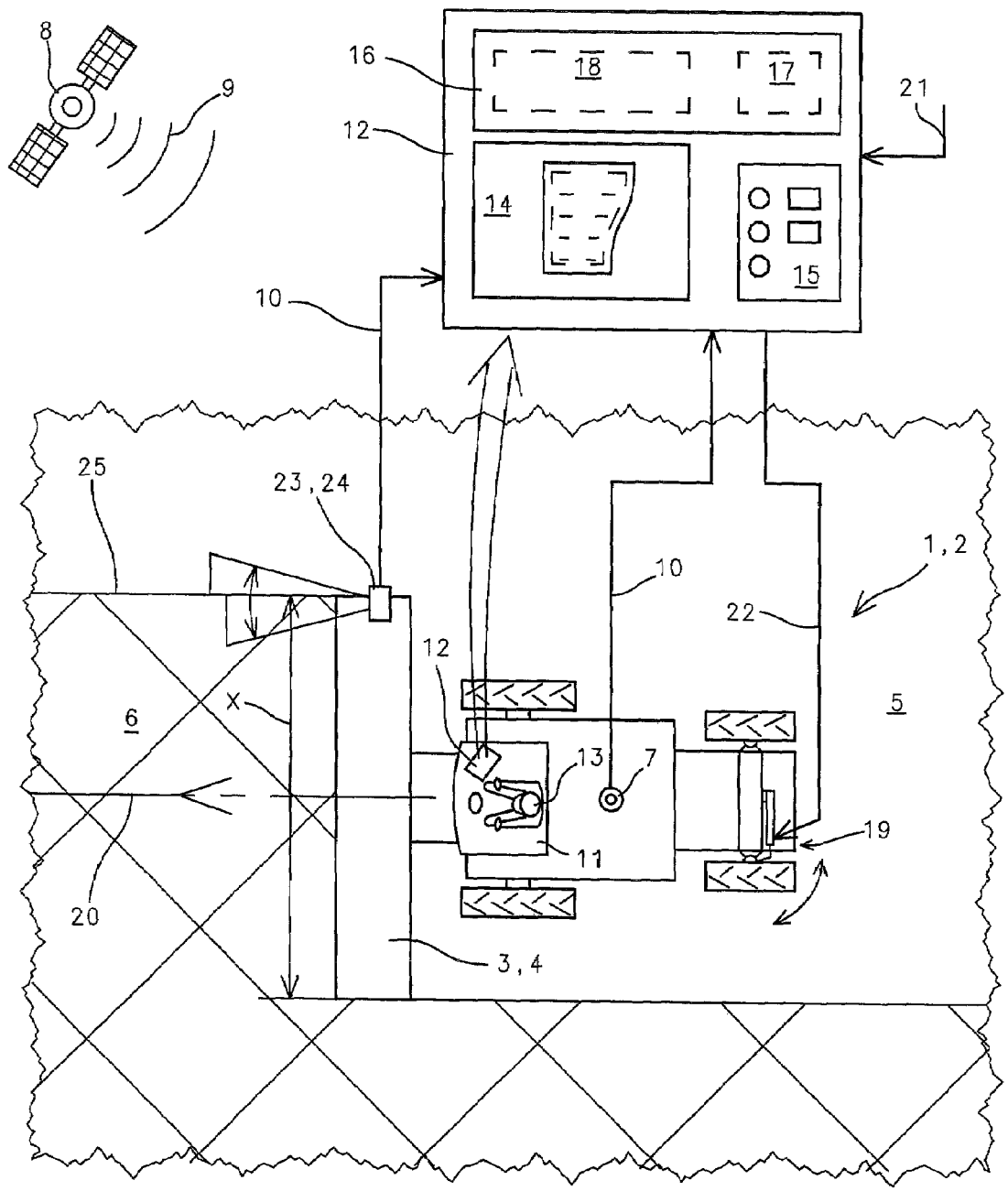
FIG. 1 shows the top view of an agricultural working machine with a detailed view of the evaluation and control unit according to the present invention

FIG. 1 shows an agricultural working machine 1 designed as a combine harvester 2, to the front region of which a front attachment 4 designed as a grain-cutting device 3 is assigned, to harvest a crop 6 growing in a territory 5 to be worked. Combine harvester 2 includes a GPS locating device 7 which receives position signals 9 generated by GPS satellites 8 and, based on these, generates position signals 10 for combine harvester 2. In addition, at least one control and evaluation unit 12 is located within reach of operator 13 in driver's cab 11 of combine harvester 2, which includes at least one display unit 14, an input unit 15, and a programming module 16, as shown in its schematic enlargement in FIG. 1.

Inventive route planning system 17, which will be described in greater detail below, and navigation module 18 are stored in programming module 16. In addition, combine harvester 2 includes a steering system 19 which can be controlled automatically, so that combine harvester 2 can move automatically on predefined driving routes 20 in territory 5 to be worked. In the simplest case, this automated guidance of the agricultural working machine can be carried out by storing driving routes 20 to be worked in control and evaluation unit 12, these driving routes 20 being generated externally or in control and evaluation unit 12 itself. If they are generated externally, external driving route signals 21 are then typically transmitted to evaluation and control unit 12 via remote data transfer. With consideration for position signals 10 of combine harvester 2 generated by GPS locating device 7, "steering signals" 22 are generated in control and evaluation unit 12 and are transmitted to steering system 19, so that agricultural working machine 1 can be guided automatically on a defined driving route 20 in territory 5 to be worked. It is within the scope of the present invention that position signals 10 of agricultural working machine 1 can also be generated in territory 5 to be worked by optoelectrical locating devices 23, such as a laser scanner 24 which detects a crop edge 25.

Figure 2:
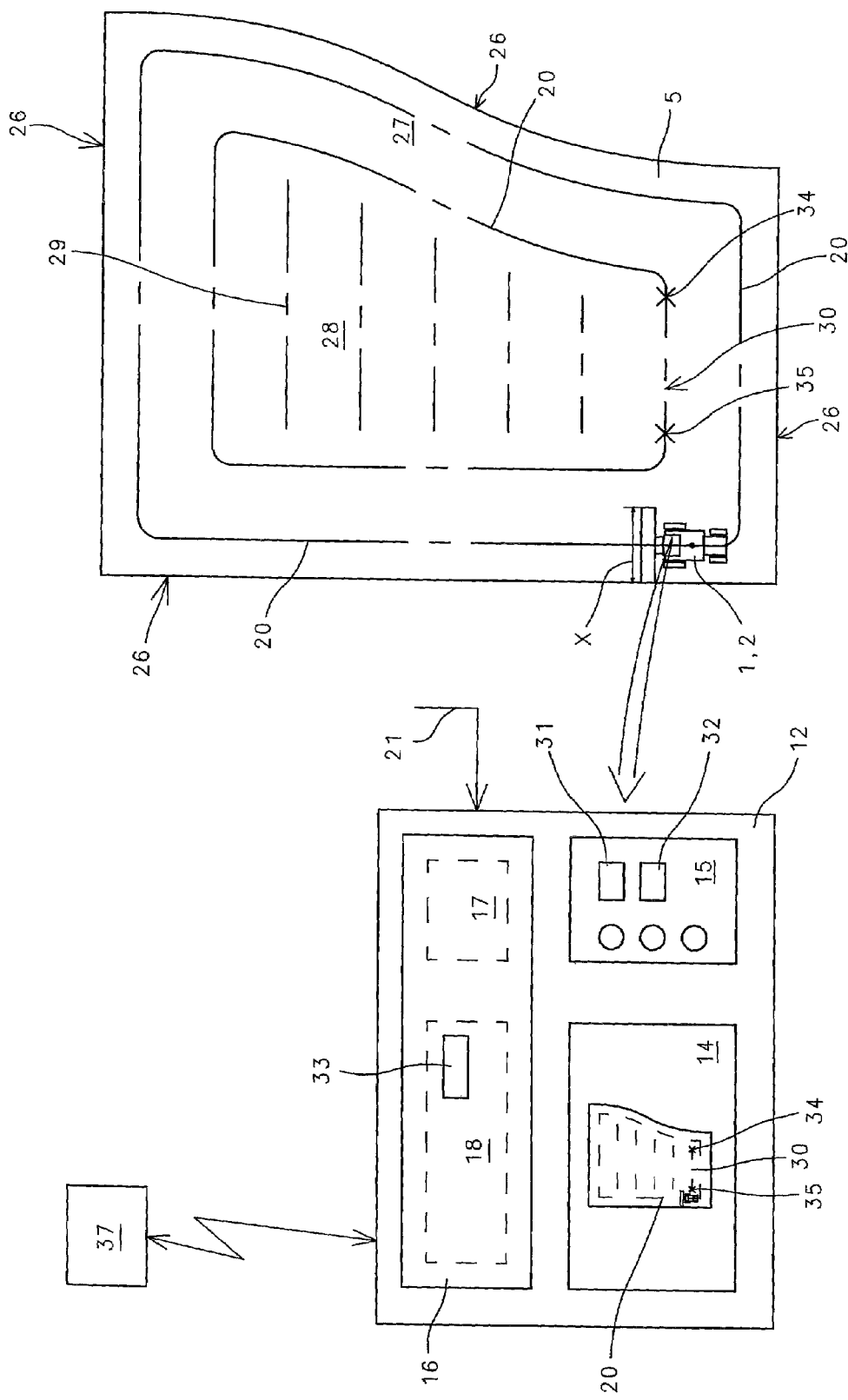
FIG. 2 shows a schematic illustration of the route planning system according to the present invention

According to FIG. 2, territory 5 to be worked can have any type of outer contour 26. Driving routes 20 to be driven by agricultural working machine 1 should be selected depending on working width X of agricultural working machine 1 such that adjacent driving routes 20 are separated by a distance which nearly corresponds to working width X of agricultural working machine 1. Outermost driving route 20—which is indicated in FIG. 2 by a dashed line—must first be determined by driving once around territory 5 to be worked, or—if it has already been driven and generated—it can be transmitted directly to control and evaluation unit 12 of combine harvester 2 via external driving route signals 21.

Depending on the nature of territory 5 to be worked and the size of agricultural working machine 1, it can be necessary for agricultural working machine 1 to work several driving routes 20 which follow outer contour 26 of territory 5 to be worked. In this case, it is possible to automatically work at least innermost driving routes 20. Depending on outer contour 26 of territory 5 to be worked, it is possible for entirely different geometries and layouts of driving tracks to result, as shown in FIG. 2. This is where the present invention comes in. An optimal layout of the driving tracks in a territory 5 to be worked can be structured, e.g., such that, after one or more driving routes 20 which follow outer contour 26 of territory 5 to be worked and which are located in turnaround 27, it is possible to traverse and work remaining territory 28 more efficiently using different driving tracks 29.

To generate these driving routes 29, a "reference line" 30 is required, which defines the orientation of new driving routes 29 to be generated in territory 5 to be worked. In the inventive manner, reference line 30 is generated as follows: While agricultural working machine 1 is guided automatically along an outermost driving route 5 which follows outer contour 26 of territory 5 to be worked, operator 13 of agricultural working machine 1 can activate and stop a recording mode 33 which is assigned to navigation module 18 by actuating a start button 31 or a stop button 32. During activation of recording mode 33, the contour of driving route 20 traveled by agricultural working machine 1 in this period of time is recorded as a new reference line 30 and is stored in programming module 16. Actuating start button 31 or stop button 32 causes "start points" 34 and "end points" 35 to be generated simultaneously. Start points 34 and end points 35 are at least stored and, in an advantageous embodiment of the present invention, they can also be visualized in display unit 14.

In this context, it is also feasible for display unit 14 to include a "touchscreen monitor" 36, on which operator 13 can select start point 34 and end point 35 of reference line 30 to be generated directly in driving route 20 shown, without having to activate push buttons 31, 32. It is within the scope of the present invention that the storage of recorded reference line 30 can also be transferred to a central arithmetic unit 37. This would have the advantage, in particular, that new driving routes 29 which follow the contour of generated reference line 30 can be generated in central computer units 37, so that the computer capacity required for this need not be installed on agricultural working machine 1. As such, control and evaluation unit 12 located on combine harvester 2 can be designed in a cost-favorable manner.

Figure 3:
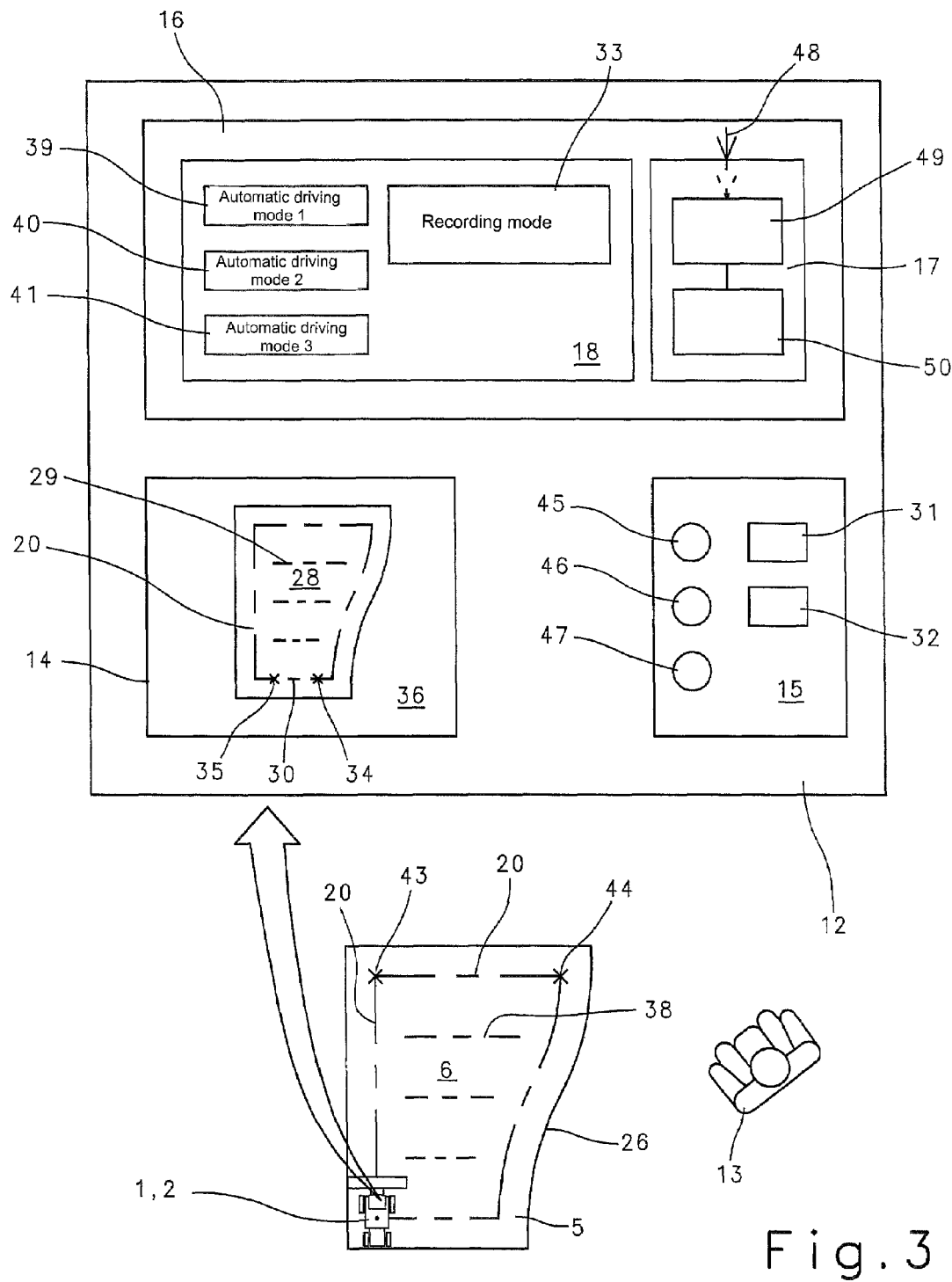
FIG. 3 shows a schematic depiction of the control and evaluation unit with the programming module according to the present invention

The principle of driving-route generation and the structure of programming module 16 required therefore are explained in greater detail in FIG. 3 with reference to a schematic illustration. Territory 5 to be worked, agricultural working machine 1 designed as a combine harvester 2, and driving routes 20 to be worked and which have different structures are shown in the lower section of FIG. 3. Upper section of FIG. 3 shows an enlarged depiction of control and evaluation unit 12 with a detailed schematic view of the data generation. As described above, control and evaluation unit 12 includes a display unit 14, an input unit 15, and a programming module 16. Programming module 16 also includes at least one route planning system module 17 and inventive navigation module 18. The strict separation between navigation module 18 and route planning system module 17 depicted in FIG. 3 was selected only for purposes of enhancing clarity. It is within the scope of the present invention for these to be combined in one module, in programming module 16.

Automatic driving modes 39-41 and at least one recording mode 33 for recording a reference line 30 are stored in navigation module 18 in a manner according to the present invention. In the exemplary embodiment shown, automatic driving modes 39-41 include a first automatic driving mode, "drive along a straight line bounded by a start point and an end point" 39, a second automatic driving mode, "drive along a contour route bounded by a start point and an end point" 40 and a further automatic driving mode, "contour drive without limitation by a start point and an end point" 41. The descriptions of automatic driving modes 39-41 indicate what their purposes are, i.e., automatic driving modes 39 and 40 automatically guide agricultural vehicle 1 on driving routes 20 which are determined by predefined start points 43 and end points 44, in which case driving route 20 is designed as a straight path or a curved contour path.

In contrast, further automatic driving mode 41 functions such that a first, outer driving route 20—which, e.g., follows outer contour 26 of territory 5 to be worked—is covered by agricultural working machine 1. Outer driving route 20 is followed depending on whether its geodata are available or are not controlled automatically or are controlled by operator 13. In the exemplary embodiment shown, particular automatic driving mode 39-41 can be selected using preselection switches 45-47. As described above, recording mode 33, which is also integrated in navigation module 18, can be activated and ended, e.g., using start and stop buttons 31, 32 or by defining start and end points 34, 35 of reference line 30 on a touchscreen monitor 36.

The use of a touchscreen monitor 36 also has the advantage that a reference line 30 can be selected at any point in time when a large number of driving routes 20, 29 which have already been worked or which have yet to be worked are displayed on touchscreen monitor 36. In an advantageous embodiment of the present invention, various automatic driving modes 39-41 are linked with recording mode 33 such that the inventive recording of a reference line 30 can take place in any of the automatic driving modes 39-41 available or independently of whether one of the available automatic driving modes 39-41 is activated. In this manner it is possible to start recording mode 33 in a first automatic driving mode 39-41 and to generate a reference line 30, which is then used to generate driving routes 29 for an automatic driving mode 39-41 other than the one that is active during the recording process.

For example, recording mode 33 can be started while agricultural working machine 1 is being operated in the automatic driving mode "contour driving without limitation by a start point and an end point" 41, and it can record a reference line 30 which is used to generate driving routes 29 for the automatic driving mode "drive along a straight path bounded by a start point and an end point" 39. By defining a start point 34 and an end point 35 for recording reference line 30 during the contour drive in the manner described above, recording mode 33 generates a straight line extending between these points 34, 35, as reference line 30.

In the exemplary embodiment depicted in FIG. 3, agricultural working machine 1 would be operated, e.g., in third automatic driving mode 41, to work driving route 20 which defines outer contour 26 of territory 5 to be worked. It is within the scope of the present invention that agricultural working machine 1 can also be operated in another one of the automatic driving modes 39, 40, or that it is possible to switch to another automatic driving mode 39-41 during operation in the one automatic driving mode 39-41. As soon as combine harvester 2 has reached the straight route on the bottom, operator 13 of combine harvester 2 activates start button 31 to define start point 34 of the recording process.

Stop button 32 is actuated at the end of this straight route, thereby halting the recording, by defining an end point 35. The route located between start and end points 34, 35 becomes reference line 30 which, in the simplest case, is stored in control and evaluation unit 12 and forms input information 48 for inventive route planning system 17. Route planning system 17 includes a "crop bed function module" 49 in which, based on generated reference line 30, fills a remaining territory 28 to be worked with driving routes 29 and stores them in a "crop bed function" 50.

Crop bed function 50, which is now stored, can be implemented by calling it up specifically, or by operator 13 steering agricultural working machine 1 into crop 6 parallel to the position of generated reference line 30, whereby programming module 16 automatically detects that recorded crop bed function 50 should now be implemented. It is within the scope of the present invention that a large number of crop bed functions 50 can be stored in programming module 16, and that each crop bed function 50 includes driving routes 20, 29 which are structured differently. The different structure of driving routes 20, 29 can include the shape, e.g., straight or curved lines, and the position in territory 5 to be worked, e.g., the north-south-east-west orientation.

It lies within the abilities of one skilled in the art to modify route planning system 17 described above in a manner not shown or to use it in other machine systems to obtain the effects described, without leaving the scope of the present invention.

It will be understood that each of the elements described above, or two or more together, may also find a useful application in other types of constructions differing from the types described above.

While the invention has been illustrated and described as embodied in a method for creating reference driving tracks for agricultural working machines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention. What is claimed as new and desired to be protected by Letters Patent is set forth in the appended claims:

The invention claimed is:

1. A route planning system for agricultural working machines, with a defined working width assigned to the agricultural working machine to generate driving routes in a territory, the route planning system comprising a navigation module configured to generate the driving routes, said navigating module including at least one automatic driving mode and at least one recording mode, such that said at least one automatic driving mode and said at least one recording mode are activatable independently of each other, and the agricultural working machine is operating in said automatic driving mode, and simultaneously a reference line for an automatic mode to be implemented is recorded.

2. A route planning system as defined in claim 1, wherein said navigation module is configured so that in said at least one automatic driving mode a defined driving route is recorded, and said defined driving route represents a reference line for at least one driving route to be worked subsequently.

3. A route planning system as defined in claim 2, wherein said driving routes defined by said reference line and to be worked subsequently are combined as a crop bed function in a crop bed function module.

4. A route planning system as defined in claim 3, wherein said crop bed function includes dividing a territory to be worked into a large number of driving routes.

5. A route planning system as defined in claim 2, wherein said defined driving route is implemented by selecting a start point and an end point of said defined driving route.

6. A route planning system as defined in claim 5; and further comprising a control and evaluation unit in which the start point and the end point are selected by generating a start and stop signal.

7. A route planning system as defined in claim 6, wherein said control and evaluation unit includes a display unit designed as a touchscreen monitor, and said start point and end point are determined by making a selection on said touchscreen monitor.

8. A route planning system as defined in claim 2, wherein said automatic driving modes include driving along a straight route bounded by a start point and an end point, driving along a contour route bounded by the start point and the end point, and contour driving without limitation by the start point and the end point, or a combination of at least three automatic driving modes.

9. A route planning system as defined in claim 2, wherein a particular one of said automatic driving modes is freely selectable, and whereas said automatic driving modes are switchable therebetween.

10. A route planning system as defined in claim 2, wherein in one of said automatic driving modes, a defined driving route is recorded, and said defined driving route represents the reference line for the crop bed function of another automatic driving mode.

* * * * *